(12) United States Patent
Knoppert et al.

(10) Patent No.: US 10,234,907 B2
(45) Date of Patent: Mar. 19, 2019

(54) LINK HINGE WITH DYNAMIC LENGTH ADJUSTMENT FOR STRESS MANAGEMENT

(71) Applicant: Dell Products L.P., Round Rock, TX (US)

(72) Inventors: Michiel Knoppert, Amsterdam (NL); Deeder Aurongzeb, Austin, TX (US); Mark Ligameri, Santa Rosa, FL (US)

(73) Assignee: Dell Products L.P., Round Rock, TX (US)

( * ) Notice: Subject to any disclaimer, the term of this patent is extended or adjusted under 35 U.S.C. 154(b) by 226 days.

(21) Appl. No.: 15/250,485

(22) Filed: Aug. 29, 2016

(65) Prior Publication Data

US 2018/0059734 A1  Mar. 1, 2018

(51) Int. Cl.
*G06F 1/16* (2006.01)
*H04M 1/02* (2006.01)

(52) U.S. Cl.
CPC .......... *G06F 1/1681* (2013.01); *G06F 1/1616* (2013.01); *G06F 1/1652* (2013.01); *H04M 1/0216* (2013.01)

(58) Field of Classification Search
CPC .............. Y10T 16/547; Y10T 16/5475; Y10T 16/5401; G06F 1/1618; G06F 1/1652; G06F 1/1681; G06F 1/1616; H04M 1/0216
See application file for complete search history.

(56) References Cited

U.S. PATENT DOCUMENTS

| | | | |
|---|---|---|---|
| 2014/0196254 A1* | 7/2014 | Song | E05D 3/14 16/302 |
| 2015/0077917 A1* | 3/2015 | Song | G06F 1/1652 361/679.27 |
| 2017/0300084 A1* | 10/2017 | Morrison | G06F 1/1681 |

\* cited by examiner

*Primary Examiner* — Dimary Lopez Cruz
*Assistant Examiner* — Ingrid Wright
(74) *Attorney, Agent, or Firm* — Baker Botts L.L.P.

(57) ABSTRACT

Systems and methods are disclosed for rotationally coupling housing portions of an information handling system. An information handling system includes a housing having a first housing portion and a second housing portion. The information handling system also includes a hinge assembly coupling the first and second housing portions, the hinge assembly comprising a plurality of coupled links, the links coupled such that the links move in relation to one another to cause the hinge assembly to bend when the first housing portion is rotated in relation to the second housing portion. In addition, the information handling system includes a flexible display coupled to the first housing portion and the second housing portion, the flexible display covering the hinge assembly, the flexible display configured to bend when the hinge assembly bends.

17 Claims, 9 Drawing Sheets

LINK HINGE WITH DYNAMIC LENGTH ADJUSTMENT FOR STRESS MANAGEMENT

TECHNICAL FIELD

This disclosure relates generally to information handling systems and, more particularly, to a link hinge with a dynamic length adjustment for stress management.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable information handling systems, such as, smart phones, tablet computers, notebook computers, media players, digital cameras, 2-in-1 tablet-laptop combination computers, wireless organizers, and/or combinations thereof. A portable information handling system may generally be any device that a user may carry for handheld use and that includes a processor. Portable information handling systems may include one or more flexible displays that bend and flex as the portable information handling system is adjusted between various positions by the user. Such bending may cause stress to the flexible display. Thus, it may be desirable to control the stress caused to a display as the portable information handling system is adjusted between various positions.

SUMMARY

In some embodiments, an information handling system is disclosed that includes a housing having a first housing portion and a second housing portion. The system also includes a hinge assembly coupling the first and second housing portions, the hinge assembly comprising a plurality of coupled links, the links coupled such that the links move in relation to one another to cause the hinge assembly to bend when the first housing portion is rotated in relation to the second housing portion. In addition, the system includes a flexible display coupled to the first housing portion and the second housing portion, the flexible display covering the hinge assembly, the flexible display configured to bend when the hinge assembly bends.

In another embodiment, a method is disclosed that includes rotationally coupling a first housing portion and a second housing portion of the portable information handling system with a hinge assembly, the hinge assembly comprising a plurality of coupled links, the links coupled such that the links move in relation to one another to cause the hinge assembly to bend when the first housing portion is rotated in relation to the second housing portion. The method also includes coupling a flexible display to the first housing portion and the second housing portion, the flexible display covering a portion of the hinge assembly, the flexible display configured to bend when the hinge assembly bends.

In a further embodiment, a hinge assembly for an information handling system is disclosed that includes a first link coupled to a first housing portion of the information handling system. The system also includes a second link coupled to a second housing portion of the information handling system, the second link coupled to the first link such that the first link and second link move in relation to one another to cause the hinge assembly to bend when the first housing portion is rotated in relation to the second housing portion.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the unhyphenated form of the reference numeral refers to the collective or generic element. Thus, for example, widget "72-1" refers to an instance of a widget class, which may be referred to collectively as widgets "72" and any one of which may be referred to generically as a widget "72."

As noted previously, portable information handling systems may include one or more flexible displays. Such displays may bend as the portable information handling system is rotated, bent, and/or adjusted to different positions. Such bending may cause stress (e.g., tensile stress) on the flexible display at or near the bend location(s), which in turn may affect the structural integrity, performance, and/or durability of the display. For example, a flexible display may extend over a portion of a hinge assembly rotationally coupling housing portions of the portable information handling system. As the housing portions rotate to different positions relative to each other, the flexible display may bend at different degrees, resulting in varying amounts of stress on the flexible display at or near the hinge location. As described in more detail below, the hinge assembly may be designed to control and reduce the stress on the flexible display as the housing portions are rotated.

For the purposes of this disclosure, an information handling system may include an instrumentality or an aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a server, a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Particular embodiments are best understood by reference to FIGS. 1-6 wherein like numbers are used to indicate like and corresponding parts.

Figure 1:
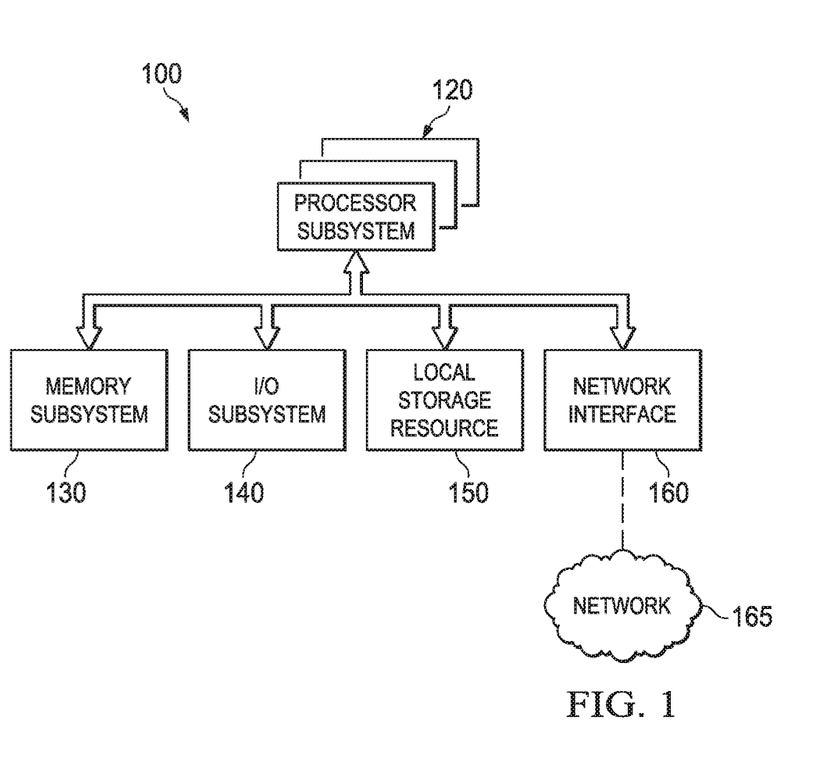
FIG. 1 illustrates a block diagram of selected elements of an embodiment of a portable information handling system.

FIG. 1 illustrates a block diagram of selected elements of an embodiment of a portable information handling system 100 in accordance with some embodiments of the present disclosure. In various embodiments, portable information handling system 100 may represent different types of portable information handling systems, such as, smart phones, tablet computers, notebook computers, media players, digital cameras, 2-in-1 tablet-laptop combination computers, and wireless organizers. Components of portable information handling system 100 may include, but are not limited to, processor subsystem 120, which may comprise one or more processors, and system bus 121 that communicatively couples various system components to processor subsystem 120 including, for example, memory subsystem 130, I/O subsystem 140, local storage resource 150, and network interface 160. External or remote elements, such as network 165, are also shown to give context to an environment in which portable information handling system 100 may be configured to operate.

Processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130). In the same or alternative embodiments, processor subsystem 120 may interpret and/or execute program instructions and/or process data stored remotely (e.g., in a network storage resource, not shown).

System bus 121 may represent a variety of suitable types of bus structures, including for example, a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, PCI bus, PCI-E bus, HyperTransport (HT) bus, Integrated Interchip Sound (IIS) bus, Serial Peripheral Interface (SPI) bus, and Video Electronics Standards Association (VESA) local bus, among others. Although illustrated as a single bus in FIG. 1, system bus 121 may be implemented as a combination of one or more suitable busses, and in some embodiments, various components may use one or more different busses to communicate with other components of portable information handling system 100.

Memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as portable information handling system 100, is powered down.

In portable information handling system 100, I/O subsystem 140 may comprise a system, device, or apparatus generally operable to receive and/or transmit data to/from/within portable information handling system 100. I/O subsystem 140 may represent, for example, a variety of communication interfaces, graphics interfaces, video interfaces, user input interfaces, and/or peripheral interfaces. For example, I/O subsystem 140 may comprise a touch panel and display adapter. The touch panel (not shown) may include circuitry for enabling touch functionality in conjunction with a display (not shown) that is driven by display adapter (not shown).

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. For example, local storage resource 150 may store executable code in the form of program files that may be loaded into memory 130 for execution. In addition to local storage resources 150, in some embodiments, portable information handling system 100 may communicatively couple via network 165 to a network storage resource (not shown) using network interface 160 discussed below.

Network interface 160 may be a suitable system, apparatus, or device operable to serve as an interface between portable information handling system 100 and network 165. Network interface 160 may enable portable information handling system 100 to communicate over network 165 using any suitable transmission protocol and/or standard, including, but not limited to various transmission protocols and/or standards. Network 165 coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data or information). In some embodiments, network 165 communicatively coupled to network interface 160 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 165, network interface 160, and/or various components associated therewith may be implemented using hardware, software, or any combination thereof. Network interface 160 may enable wired and/or wireless communications to and/or from portable information handling system 100.

Figure 2:
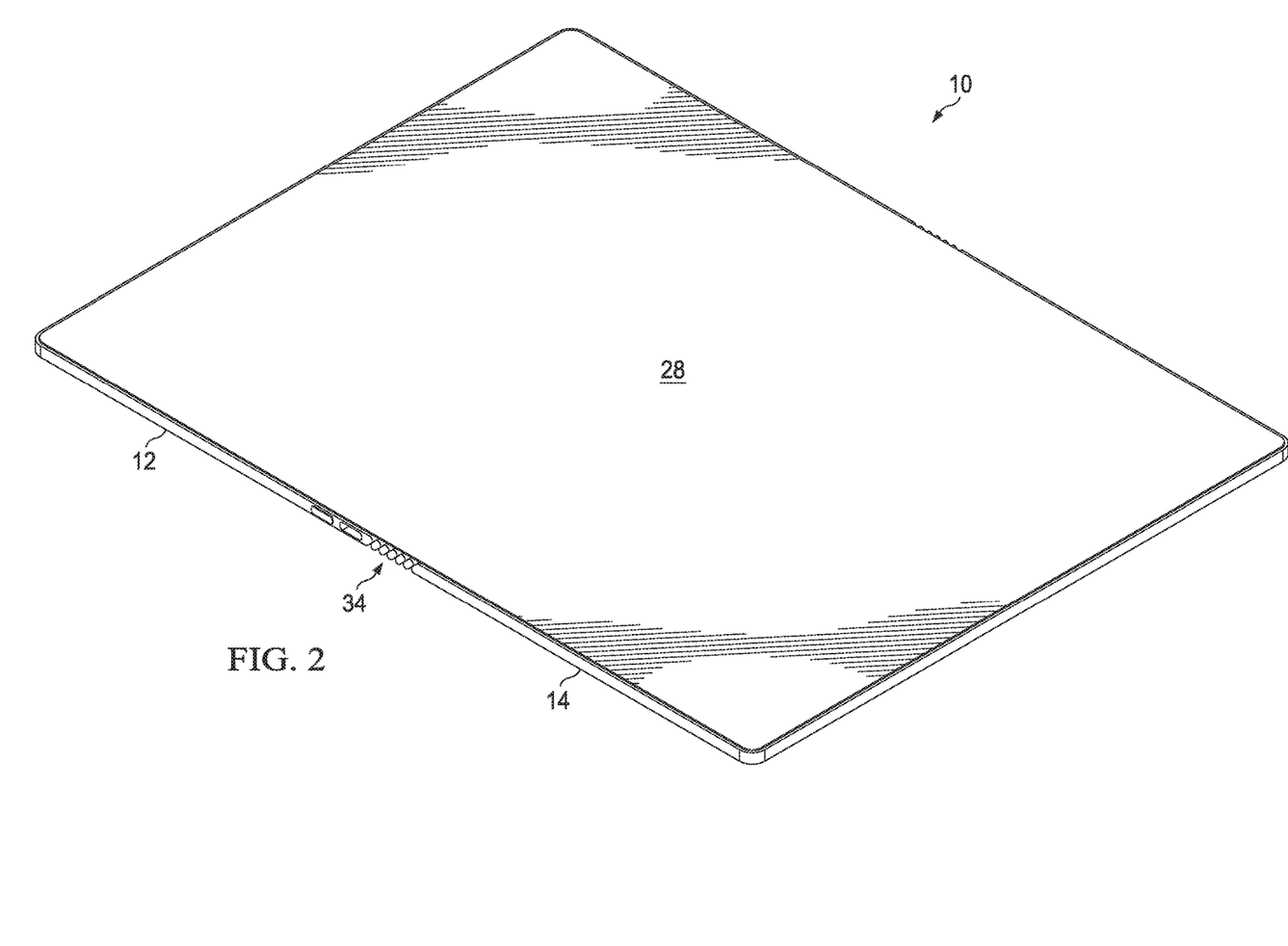
FIG. 2 illustrates a perspective view of a portable information handling system having rotationally-coupled housing portions.

FIG. 2 is a perspective view of a portable information handling system having rotationally-coupled housing portions. In the example embodiment, a main housing portion 12 rotationally couples to a lid housing portion 14 to support various configurations to interact with an end user. More specifically, main housing portion 12 couples to lid housing portion 14 via hinge assembly 34 such that a user may rotate main housing portion 12 and/or lid housing portion 14 relative to each other. Main housing portion 12 and lid housing portion 14 may hold one or more components of the portable information handling system, including but not limited to processor subsystem 120, system bus 121, memory subsystem 130, I/O subsystem 140, local storage resource 150, and network interface 160 discussed above with respect to FIG. 1.

In some embodiments, portable information handling system 10 may include one or more displays for visually presenting information. For example, display 28 may be a touch panel with circuitry enabling touch functionality in conjunction with a display such that a user may provide input to portable information handling system 10 through the display. In some embodiments, display 28 may be flexible such that it can bend and change shapes while still visually presenting information to and/or accepting input from the user. For example, display 28 may be an organic light-emitting diode (OLED) formed on a flexible plastic, such as polyethylene terephthalate. In some embodiments, display 28 may couple to main housing portion 12 and lid housing portion 14 such that display 28 extends over at least some portion of hinge assembly 34.

As explained below in further detail, hinge assembly 34 allows main housing portion 12 and lid housing portion 14 to rotate between a plurality of positions. For example, when portable information handling system 10 is not in use, lid housing portion 14 may be closed over the top of main housing portion 12 so that display 28 is protected from unintended use or damage. Rotation of lid housing portion 14 by approximately 90 degrees from main housing portion 12 brings display 28 in a raised "laptop" position. In some embodiments, laptop position may represent lid housing portion 14 open between approximately 1 and 179 degrees from main housing portion 12. Rotation of lid housing portion at approximately 180 degrees from main housing portion 12 (as illustrated in FIG. 2) may place portable information handling system 10 in "tablet" and/or "table" position. In tablet position, display 28 is flat and exposed to accept touch inputs and display information. Display 28 may bend at varying degrees as portable information handling system 10 is moved between positions (e.g., tablet, laptop, closed positions). In any position, user inputs may be communicated to an I/O subsystem and/or processor subsystem of the portable information handling system for processing, and then updated information may be communicated back to display 28 for displaying to the user.

Figure 3:
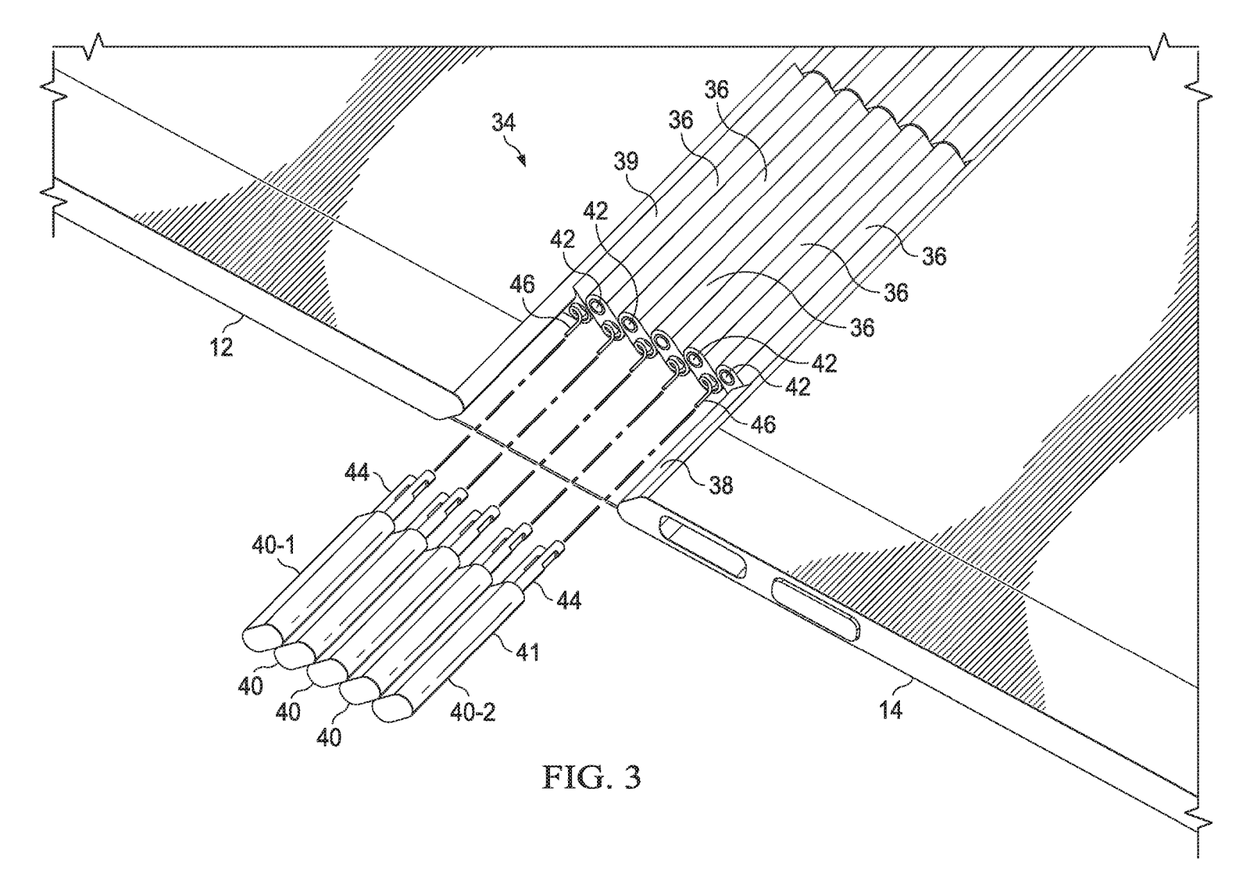
FIG. 3 illustrates a blown-up view of a link hinge assembly of a portable information handling system.

FIG. 3 is a blown-up view of a link hinge assembly of a portable information handling system. As discussed above with respect to FIG. 2, hinge assembly 34 may rotationally couple main housing portion 12 and lid housing portion 14 of portable information handling system 10 such that the two housing portions may rotate to different positions relative to each other.

In some embodiments, the hinge assembly of the portable information handling system may be a link hinge. For example, hinge assembly 34 may include one or more links 36 coupled to each other by locking elements 40. Each link 36 may include one or more receptacles 42, and each locking element 40 may include one or more pins 44 that couple to receptacles 42. Thus, locking elements 40 may couple each link 36 to one or more neighboring links 36, thereby forming a chain.

Links 36 may be an elongated shape formed of durable material. In some embodiments, link 36 may have rounded edges, forming an oval prism, as shown in FIG. 3. In other embodiments, link 36 may form a rectangular prism or another suitable shape that permits links 36 to move (e.g., slide) in relation to each other so that the main housing portion 12 may rotate in relation to lid housing portion 14. Links 36 may be comprised of a durable thermal plastic, which in some embodiments, may include one or more additives, such as glass fiber or carbon fiber, to enhance the strength and stiffness of the material. In some embodiments, links 36 may be comprised of aluminum, carbon fiber, and/or another suitable material. Links 36 may be solid or hollow, and in some embodiments, may be composed of more than one material. Selection of the shape, design, and material for links 36 may be based on cost, durability, weight, and/or other considerations.

Locking element 40 may couple links 36 to form a chain. Locking elements may include a main body 41 and one or more pins 44 that extend from the main body. Main body 41 may be comprised of any of the materials recited above for links 36 (e.g., thermal plastic, aluminum, carbon fiber, and/or another suitable materials), and may be in any of the shapes recited above for links 36 (e.g., oval prism, rectangular prism, or another suitable shape that permits main bodies 41 to move in relation to each other). In some embodiments, main body 41 may be comprised of a similar material and formed in a similar shape as links 36. In certain embodiments, main body 41 may be a small end cap (e.g., a piece of metal or other durable material) that holds pins 44 together.

Each locking element 40 may include two pins 44 for coupling links 36. Pins 44 may be coupled to or formed integrally with main body 41 and extend from main body 41. Pins 44 of a locking element 40 may couple neighboring links 36. For example, one pin 44 may insert into a receptacle 42 of link 36, and the other pin 44 may insert to a receptacle 42 of a neighboring link 36 so that links 36 are coupled together via locking element 40. In this manner, locking elements 40 may rotatably couple links 36 to form a chain. Similar to links 36, locking elements 40 may move (e.g., slide) in relation to each other as main housing portion 12 rotates in relation to lid housing portion 14. Pins 44 may be comprised of a rigid and durable material, such as steel, aluminum, and/or another suitable material. Pins 44 may be shaped to fit within receptacle 42 of links 36. The size, shape, and material of pin 44 and receptacle 42 may be selected to achieve a particular friction and rigidity in hinge assembly. For example, a tighter fit of a pin 44 in a receptacle 42 (e.g., by increasing the diameter of pin 44 or decreasing the diameter of receptacle 42) may create more friction to hold one or more links 36 in place. As another example, the shape (e.g., cylinder, hexagonal prism, etc.) and/or finish (e.g., smooth or rough) of pin 44 and/or receptacle 42 may be selected to achieve a particular friction. The friction and rigidity in hinge assembly may be used to hold the housing portions of the portable information handling system in a particular position (e.g., closed, laptop, tablet). Selection of the shape, design, and material used for pins 44 and receptacle 42 may be based on cost, durability, weight, friction, and/or other considerations. As shown in FIG. 3, locking elements 40 may be oriented approximately 180 degrees relative to links 36 when portable information handling system 10 is in tablet mode.

In addition to coupling links 36, locking elements 40 may also couple hinge assembly 34 to the housing portions of portable information handling system 10. For example, main housing portion 12 may include hinge attachment 39. Hinge attachment 39 may include a receptacle 42, similar to links 36. The closest locking element to main housing portion 12, locking element 40-1, may couple hinge attachment 39 to the first link 36 of hinge assembly 34. Lid housing portion 14 may include hinge attachment 38 with a receptacle 42, similar to links 36 and main housing portion 12. Locking element 40-2 may couple lid housing portion 14 to the last link 36 in the hinge assembly. Thus, main housing portion 12 and lid housing portion 14 may couple to opposite ends of the chain formed by links 36 and locking elements 40. The selection of the shape, design, and material used for pins 44 and receptacle 42 of hinge attachments 38 and 39 may be based on cost, durability, weight, friction, and/or other considerations.

Hinge assembly 34 may include multiple sets of links and/or locking elements 40. For example, a set of one or more locking elements 40 may couple one side of links 36 and another set of one or more locking elements 40 may couple the other side of links 36. Both sets of locking elements 40 secure links 36 together and secure hinge assembly 34 to the housing portions of portable information handling system 10. In some embodiments, multiple sets of links 36 may be coupled by multiple sets of locking elements 40 (e.g., a set of locking elements 40, set of links 36, set of locking elements 40, set of links 36, set of locking elements 40 comprising the hinge assembly between the housing portions). In some embodiments, the links 36 may include pins 44 and locking elements 40 may include receptacles. Hinge assembly 34 may extend across some or all of the length between main housing portion 12 and lid housing portion 14. The dimensions of locking elements 40 and links 36, the number of sets of each, and the order of each set may depend on the design, structural integrity, performance, and/or durability of hinge assembly 34 and/or portable information handling system 10.

As is shown in more detail with respect to FIGS. 4A-C, discussed below, links 36 may move to different positions relative to each other in order to permit the housing portions of portable information handling 10 to rotate relative to each other. As shown in FIG. 3, hinge assembly may include one or more coils 46 to help control the movement of links 36 and locking elements 40, and thus the movement of main housing portion 14 and lid housing portion 12. Coil 46 may couple to pin 44 of locking element 40 at one end and receptacle 42 of link 36, hinge attachment 38, and/or hinge attachment 39 on the other end. Each end of coil 46 may be coupled to pin 44 or receptacle 42 by solder, hook, or another appropriate fastening means. In some embodiments, coil 46 may be a torsion spring comprised of metal (e.g., steel) that exerts a force in the opposite direction when twisted or rotated. The tension and/or resistance in coil 46 may change as the coil is rotated (e.g., as the housing portions are rotated in relation to each other). Thus, coil 46 may be used to vary the resistance at a particular link 36 as main housing portion 12 is rotated relative to lid housing portion 14.

Coils 46 may be used to stabilize hinge assembly 34 and/or control movement of the housing portions. For example, when portable information handling system 10 is in tablet mode, coils 46 may have a certain resistance that holds links 36 together and resists unintended movement of the hinge assembly and/or housing portions. That is, coils 46 may increase the amount of pressure required to rotate main housing portion 12 and/or lid housing portion 14. As main housing portion 12 and/or lid housing portion 14 is rotated to laptop position, links 36 may move in relation to each causing one or more coils 46 to rotate. The rotating of coil 46 increases the torque in the coil, and thus increases the coil's resistance to further rotation. Links 36 with the lesser resistance may move more than and/or before links 36 with more resistance. Thus coils 36 may be used to control the movement of links 36 within hinge assembly 34. In some embodiments, coils 46 may be selected and placed to create approximately equal resistance between links 36. However, in other embodiments, coils 46 selected and placed to create varying resistance between links 36. For example, coils 46 at links 36 near the center of the hinge assembly 34 may be designed to have less tension than the coils 46 near the housing portions. As the housing portions are rotated, the center links 36 may move more relative to the outer links 36 because they experience less resistance from coils 46. As another example, coils 46 at or near lid housing portion 14 may be designed to have less resistance than other coils 46 in hinge assembly 34 so that lid housing portion 14 may move first (e.g., before main housing portion 12) when rotational pressure is applied to the hinge assembly. The tension in coils 46 may be selected to minimize stress on display 28, maintain housing portions in particular positions, and/or achieve other functional purposes.

Figure 4A:
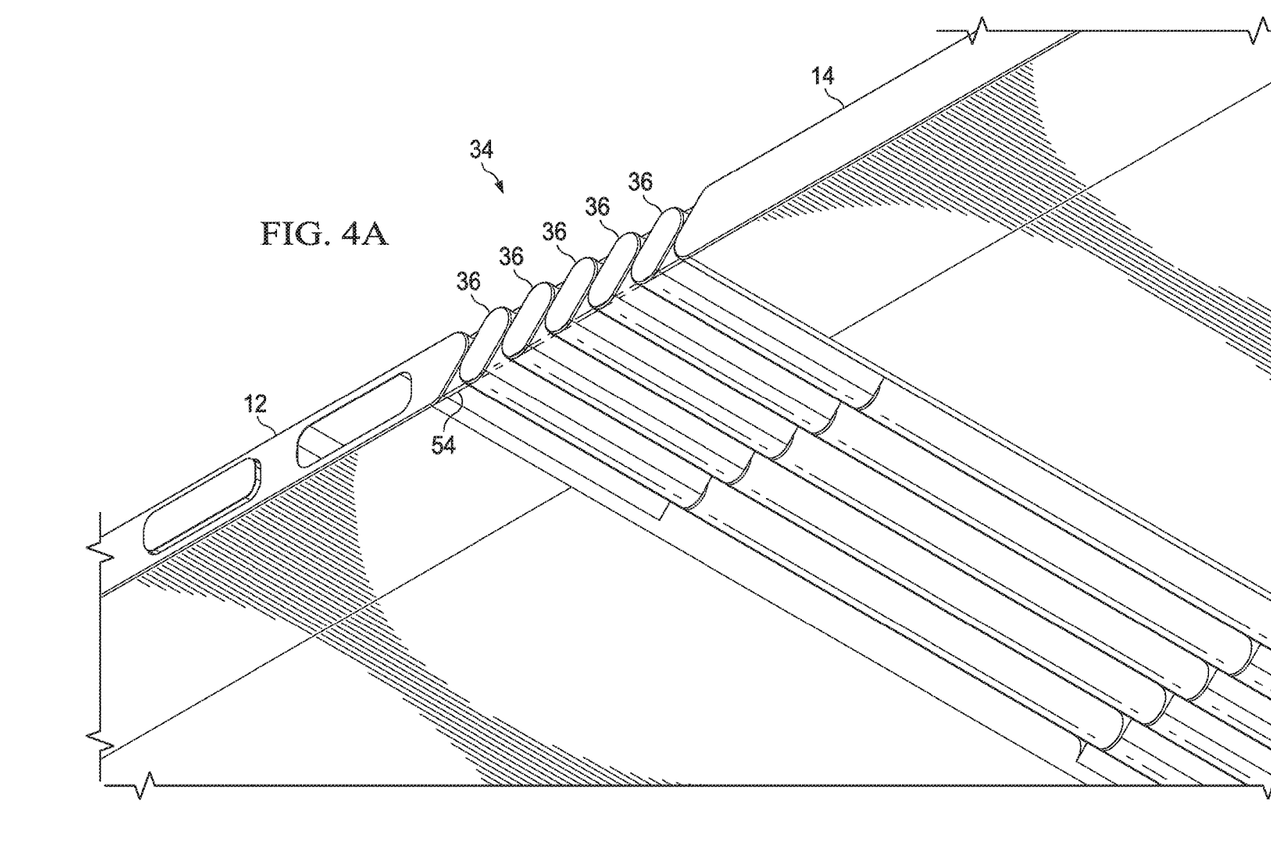
FIG. 4A illustrates a perspective view of a link hinge assembly of a portable information handling system in tablet position.
Figure 4B:
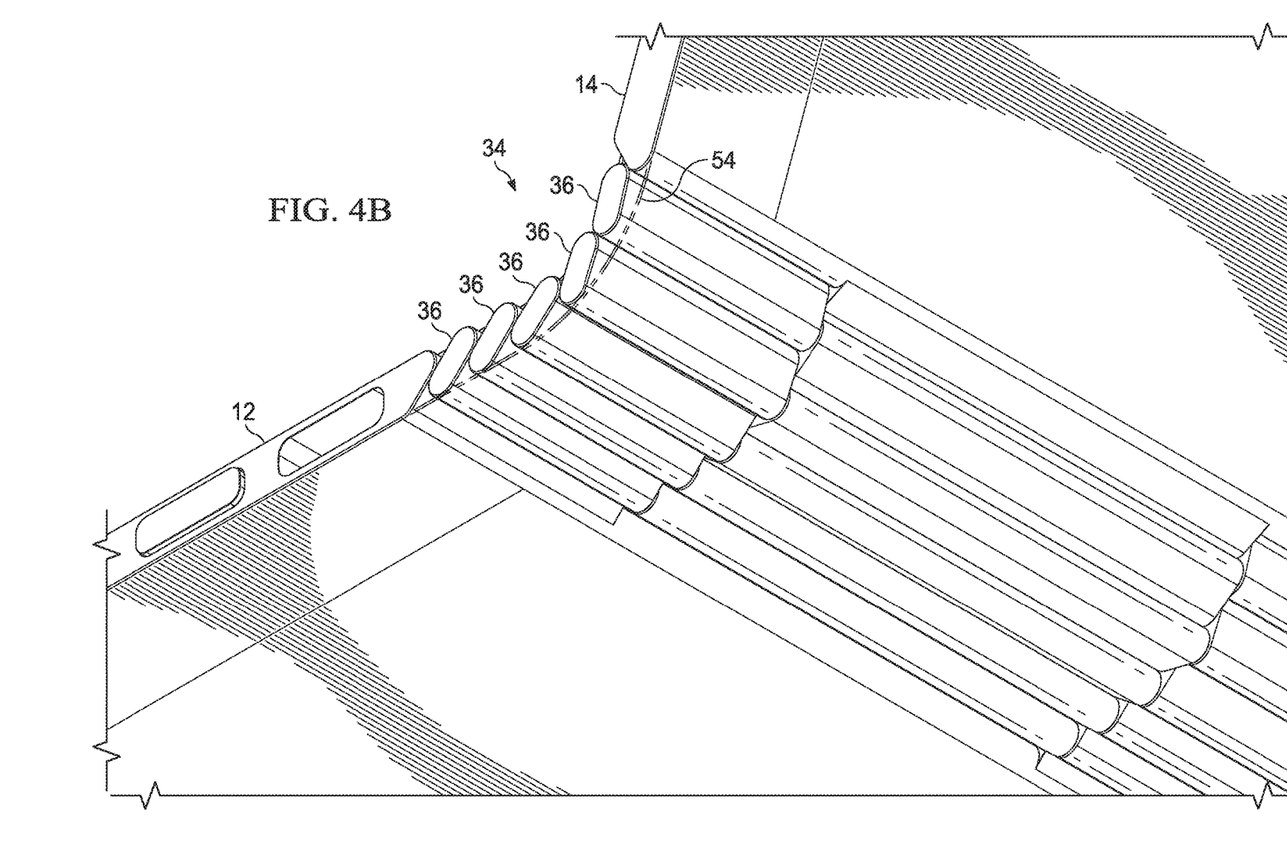
FIG. 4B illustrates a perspective view of a link hinge assembly of a portable information handling system in laptop position.
Figure 4C:
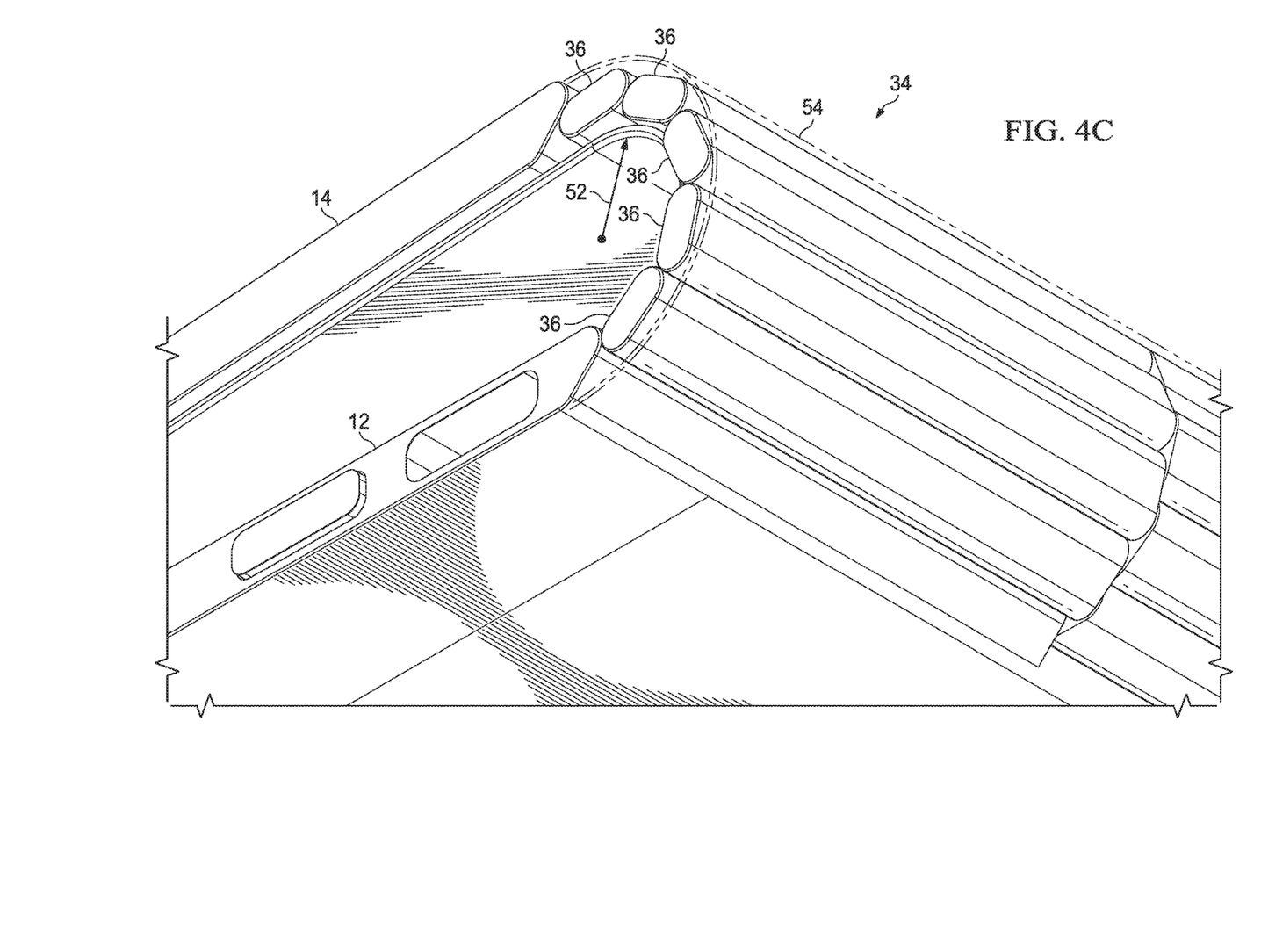
FIG. 4C illustrates a perspective view of a link hinge assembly of a portable information handling system in closed position.

FIGS. 4A-C are perspective views of a link hinge assembly of a portable information handling system in various positions.

FIG. 4A is a perspective view of a link hinge assembly of a portable information handling system in tablet position. As described above with respect to FIG. 2, main housing portion 12 and lid housing portion 14 may be at approximately 180 degrees from each other in tablet position such that the housing portions create a flat surface. Display 28 may rest on the flat surface created by the housing portions.

In tablet position, hinge assembly 34 may be in its most compressed form (e.g., shortest distance between the housing portions) causing links 36 to overlap.

FIG. 4B is a perspective view of a link hinge assembly of a portable information handling system in laptop position. As described above with respect to FIG. 2, lid housing portion 14 may be open between approximately 1 and 179 degrees from main housing portion 12 in laptop position. Display 28 may bend or curve between the housing portions. In laptop position, hinge assembly 34 may stretch as the main housing portion 12 moves farther from lid housing portion 14. For example, links 36 may slide relative to each other to have less overlap, thereby extending the length of the hinge assembly. The particular links 36 that change position as the housing portions are rotated into laptop position and the amount of such change may depend on the placement and selection of coils 46 discussed above with respect to FIG. 3. For example, in laptop position, links 36 at or near lid housing portion 14 may move relative to each other as a user applies pressure to the lid housing portion to configure the system into laptop mode. The movement of links 36 at or near lid housing portion 14 may cause coils 46 associated with these links to rotate, thereby increasing the tension of coils 46. The increased tension of coils 46 may in turn control when and how much other links 36 begin to move (e.g., the link with the most resistance may move more and before other links). Resistance from coils 46 and friction in links 36 (e.g., friction from pins 44 and/or coils 46 in receptacle 42) may cause increased rigidity in hinge assembly 34 that helps maintain the housing portions in the position selected by the user.

FIG. 4C is a perspective view of a link hinge assembly of a portable information handling system in closed position. As described above with respect to FIG. 2, lid housing portion 14 may be closed (e.g., approximately 0 degrees between the housing portions) relative to main housing portion 12 in closed position. Display 28 bends or curves between the housing portions when portable information handling system 10 is in closed position. Hinge assembly 34 may be in its most stretched position in closed position, and links 36 may have the least amount of overlap to each other as the links stretch around the curve of the hinge assembly. Similar to FIG. 4B, the movement of links 36 may cause coils 46 to rotate, which in turn may cause increased resistance and friction in hinge assembly 34 that helps maintain the housing portions in the position selected by the user.

Hinge assembly 34 may help limit and/or reduce stress on display 28 as the housing portions are rotated between various positions. For example, as display 28 bends, links 36 and locking elements 40 may provide support to the backside of display 28 near the bend (e.g., near hinge assembly 34) to help ensure an even and controlled bend of display 28. The number and dimensions of links 36, locking elements 40, and coils 46 in hinge assembly 34 may be selected to ensure a minimum bend radius 52 of the hinge assembly. Minimum bend radius 52 may ensure that display 28 does not bend past its recommended bend radius (e.g., the maximum bend that display 28 can withstand without compromising the structural integrity and continued operation of the display). Thus, hinge assembly 34 may protect display 28 from damage while also enabling the rotation of housing portions of the portable information handling system.

In some embodiments, the reverse side of the hinge assembly (e.g., the side not covered by display 28) may include an elastic cover 54, as shown in FIGS. 4A-C. Elastic cover 54 may be comprised of a malleable material, such as an elastic thermoplastic, that may compress and/or stretch as the housing portions rotate in different positions to each other. Elastic cover 54 may extend from main housing portion 12 to lid housing portion 14 such that it covers hinge assembly 34. Elastic cover 54 protects links 36 and locking elements 40 from direct contact by objects and debris external to the portable information handling system. Elastic cover 54 may also provide stability to hinge assembly 34 by restricting movement of links 36 and/or locking elements 40.

Figure 5A:
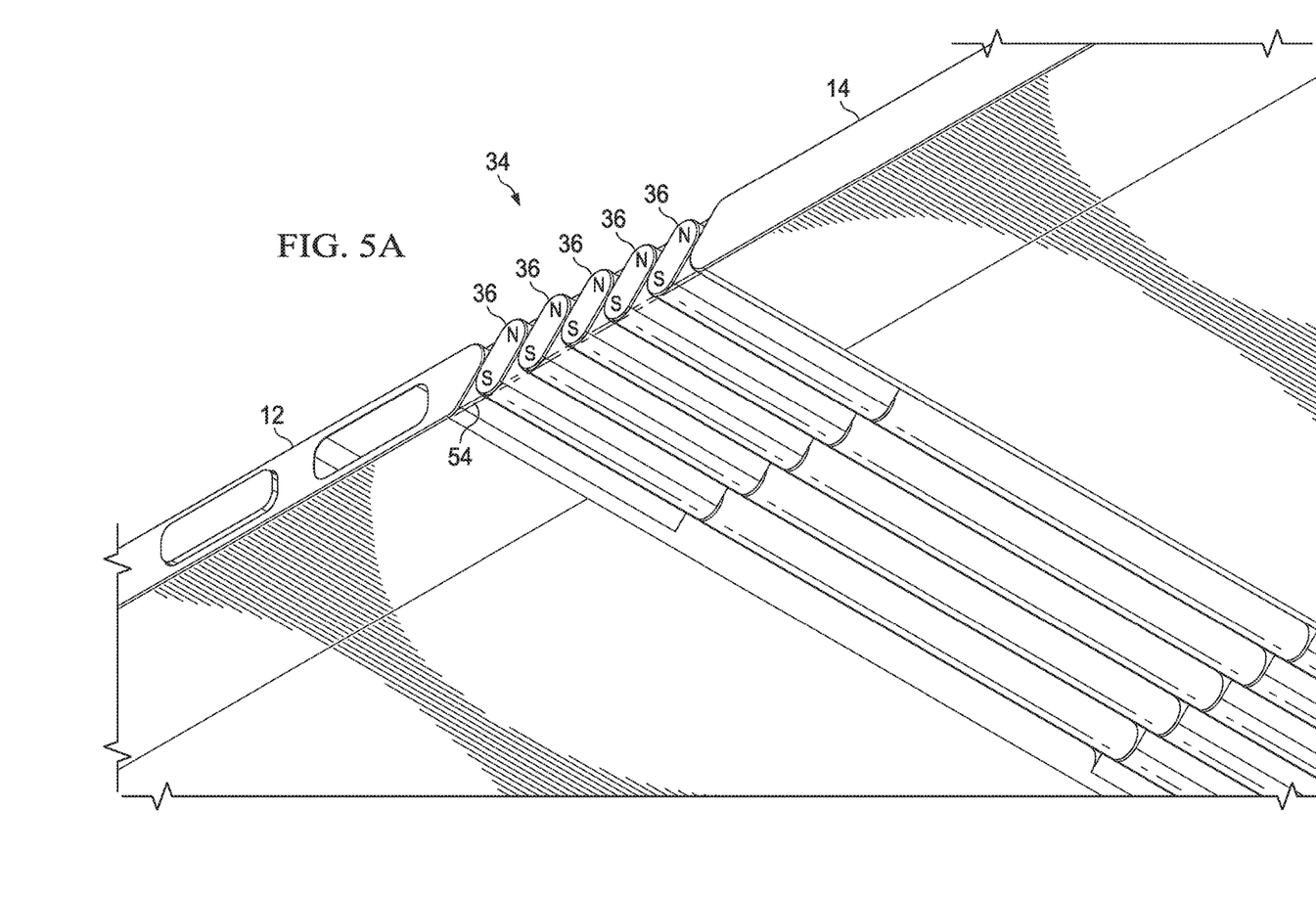
FIG. 5A illustrates a perspective view of a magnetic link hinge assembly of a portable information handling system in tablet position.

In some embodiments, hinge assembly 34 may use magnetism control and/or support the elements of the hinge assembly. For example, links 36 may include and/or be comprised of magnetic material such that each link 36 includes opposite magnetic poles. FIG. 5A is a perspective view of a magnetic link hinge assembly of a portable information handling system in tablet position. As illustrated, links 36 may overlap when portable information handling system 10 is in tablet position. The magnetic poles (e.g., labeled "N" and "S" poles) of links 36 may be oriented in tablet mode to have the least magnetic attraction to each other as compared to the other positions (e.g., as compared to closed and laptop positions). For example, the N poles of neighboring links 36 may be aligned with each other and the S poles of neighboring links 36 may be aligned with each other, resulting in reduced magnetic attraction between links 36 in tablet mode as compared to the other positions.

Figure 5B:
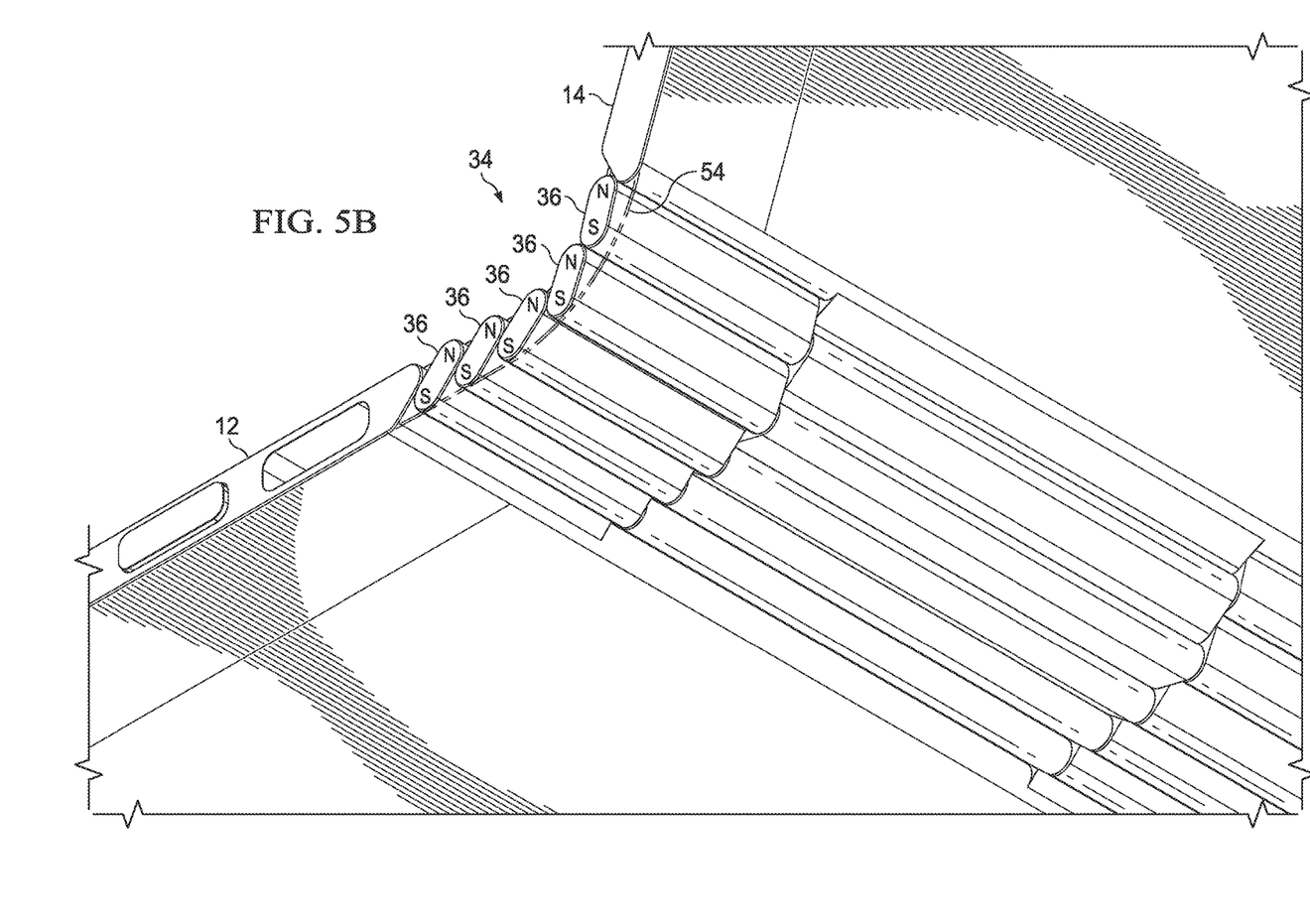
FIG. 5B illustrates a perspective view of a magnetic link hinge assembly of a portable information handling system in laptop position.

FIG. 5B is a perspective view of a magnetic link hinge assembly of a portable information handling system in laptop position. In laptop position, certain links 36 near lid housing portion 14 may move relative to each other, resulting in less overlap to neighboring links 36. As links 36 near lid housing portion 14 move, the opposite magnetic poles of these links may begin to align thereby resulting in a magnetic attraction that holds the links together more strongly than in tablet mode (e.g., the N pole of link 36 attracts S pole of neighboring link 36).

Figure 5C:
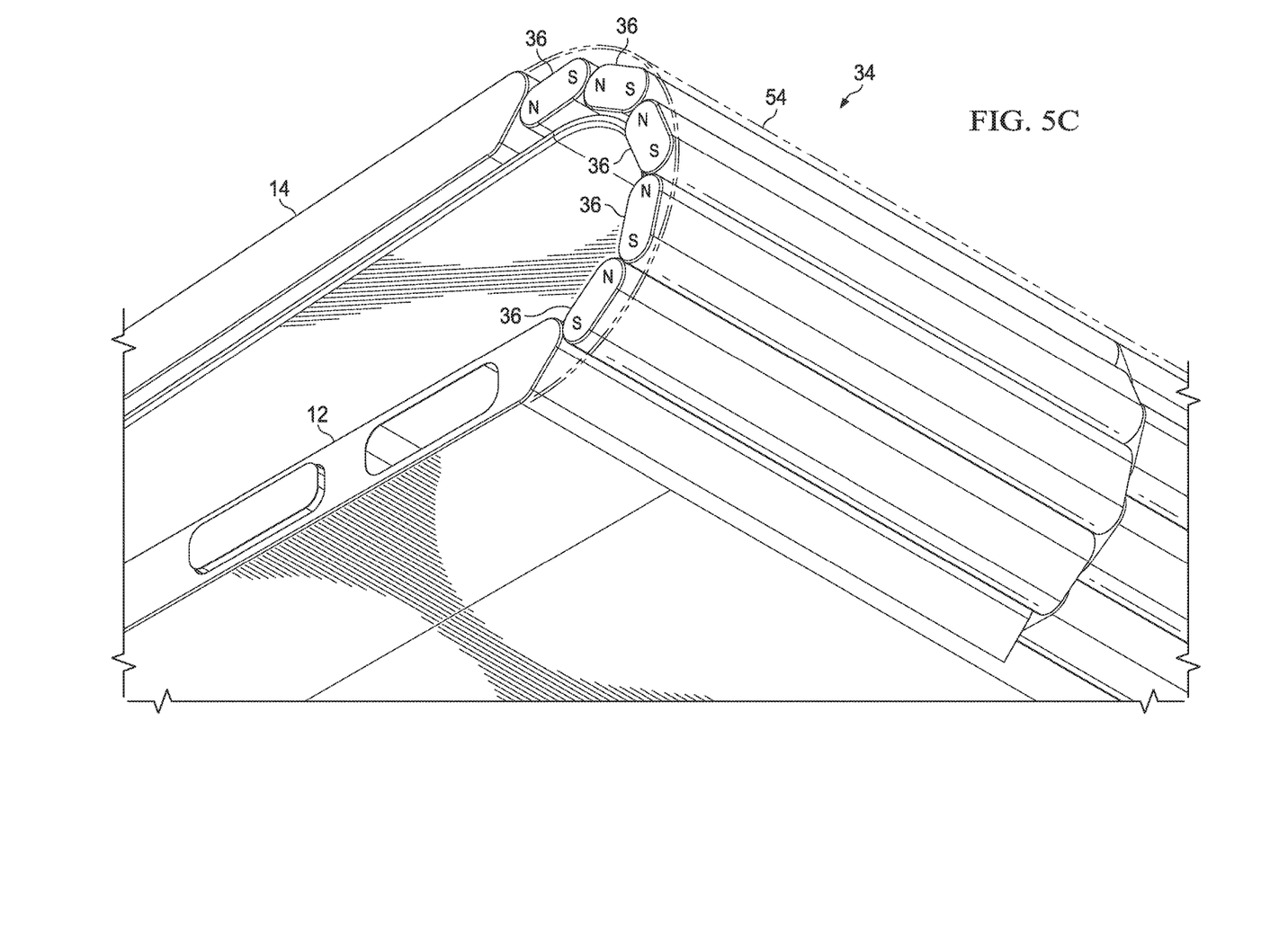
FIG. 5C illustrates a perspective view of a magnetic link hinge assembly of a portable information handling system in closed position.

FIG. 5C is a perspective view of a magnetic chain link hinge assembly of a portable information handling system in closed position. In closed position, hinge assembly 34 may be in its most stretched position and links 36 may be oriented end to end. As in FIG. 5B, the opposite magnetic poles of the links may align more closely in closed position, thereby resulting in a magnetic attraction that holds links 36 together more strongly than in the laptop position. For example, the N pole of each link 36 may be placed in proximity to the S pole of neighboring link 36 in closed position, causing the strongest magnetic attraction between links 36 as compared to the other positions. The magnet attraction in links 36 may be used to hold links 36 together in a chain.

In some embodiments, a combination of magnets and linking pins 40 may be used in hinge assembly 34. For example, linking pins 40 may be used to couple links 36 in the same manner described above with respect to FIG. 2. In addition, links 36 may use magnetism as described above with respect to FIGS. 5A-C. In some embodiments, linking pins 40 may be used to couple the hinge assembly to the housing portions (e.g., between the first link 36 and hinge attachments 39 and the last link 36 and hinge attachment 38, as illustrated in FIG. 3), and magnetism may be used to couple links 36 of hinge assembly 34. In certain embodiments, locking elements 40 may include magnetic materials that form opposite magnetic poles on each link 36, similar to links 36 as described with respect to FIGS. 5A-C. In some embodiments, hinge assembly may magnets exclusively (e.g., no locking elements) to hold links 36 together.

Figure 6:
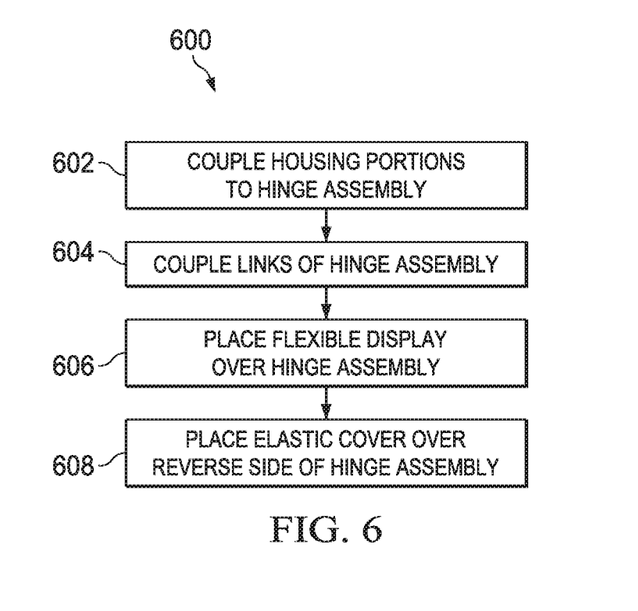
FIG. 6 illustrates a flowchart depicting selected elements of an embodiment of a method for rotationally coupling housing portions of an information handling system.

FIG. 6 illustrates an example method 600 for rotationally coupling housing portions of an information handling system. Method 600 may begin at step 602, where the housing portions of the information handling systems are coupled to a hinge assembly. The hinge assembly may permit the housing portions to rotate to different positions from each other, including for example, closed, laptop, and tablet positions discussed above with respect to FIG. 2. Each housing portion (e.g., main housing portion 12 and lid housing portion 14 illustrated in FIGS. 2-5) may include a hinge attachment (e.g., hinge attachments 38 and 39 illustrated in FIG. 3) that couples to a link (e.g., link 36 illustrated in FIGS. 2-5) closest to the housing portion.

In step 604, method 600 couples the links of the hinge assembly to each other. In some embodiments, the links may be coupled to each other by locking elements (e.g., locking elements 40 illustrated in FIG. 3). In some embodiments, the links may be coupled to each other by magnetism as discussed above with respect to FIGS. 5A-C. In certain embodiments, a combination of locking elements and magnetism may be used to couple links of the hinge assembly to each other. The links of the hinge assembly may form a chain between the housing portions of the information handling system.

In step 606, method 600 places an flexible display over the housing portions and hinge assembly. For example, the flexible display may be an OLED, as discussed in more detail with respect to FIG. 2. The flexible display may bend as the housing portions of the information handling system are rotated to different positions relative to each other.

In step 608, method 600 places an elastic cover over the reverse side of hinge assembly. The elastic cover may extend over the hinge assembly between the housing portions of the information handling system (e.g., similar to elastic cover 54 illustrated in FIGS. 4 and 5). The elastic cover may protect the links and/or locking elements of the hinge assembly from direct contact by objects and debris external to the information handling system. The elastic cover may also provide stability to the hinge assembly by restricting movement of the links and/or locking elements. After step 608, method 600 may end.

Method 600 may be implemented in any suitable manner. It is noted that certain steps or operations described in method 600 may be optional or may be rearranged in different embodiments.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An information handling system comprising:
    a housing having a first housing portion and a second housing portion;
    a hinge assembly coupling the first and second housing portions, the hinge assembly comprising:
        a plurality of links,
        a plurality of locking elements coupling the plurality of links such that the links move in relation to one another to cause the hinge assembly to bend when the first housing portion is rotated in relation to the second housing portion, wherein each of the locking elements includes:
            a first pin rotatably coupled to a receptacle of a first link, the first pin and the receptacle of the first link coupled to a first coil, the first coil creating a first resistance between the first pin and the receptacle of the first link;
            a second pin coupled to a receptacle of a second link, the second pin and the receptacle of the second link are coupled to a second coil, the second coil creating a second resistance between the second pin and the receptacle of the second link, wherein the second resistance is greater than the first resistance; and
    a flexible display coupled to the first housing portion and the second housing portion, the flexible display covering the hinge assembly, the flexible display configured to bend when the hinge assembly bends.

2. The system of claim 1, wherein the first pin and the second pin extend from a main body of the locking element, wherein the first and second links are neighboring links in the hinge assembly.

3. The system of claim 2, wherein the first resistance between the first pin and the receptacle of the first link varies as the first housing portion is rotated in relation to the second housing portion.

4. The system of claim 3, wherein the second resistance between the second pin and the receptacle of the second link varies as the first housing portion is rotated in relation to the second housing portion.

5. The system of claim 4, wherein the first link is closer to the first housing portion than the second link.

6. The system of claim 1, wherein the plurality of links include magnetic poles, the magnetic poles creating a magnetic attraction that couples the plurality of links.

7. The system of claim 6, wherein the magnetic attraction between the magnetic poles increases as the first housing portion is rotated in relation to the second housing portion.

8. The system of claim 1, wherein the hinge assembly further comprises a locking element, the locking element coupling the first housing portion to a link of the hinge assembly.

9. A method of rotationally coupling housing portions of an information handling system, comprising:
    rotationally coupling a first housing portion and a second housing portion of the information handling system with a hinge assembly, the hinge assembly comprising a plurality of links and a plurality of locking elements coupling the plurality of links such that the links move in relation to one another to cause the hinge assembly to bend when the first housing portion is rotated in relation to the second housing portion, wherein each of the locking elements includes:
- a first pin rotatably coupled to a receptacle of a first link, the first pin and the receptacle of the first link coupled to a first coil, the first coil creating a first resistance between the first pin and the receptacle of the first link;
- a second pin coupled to a receptacle of a second link, the second pin and the receptacle of the second link are coupled to a second coil, the second coil creating a second resistance between the second pin and the receptacle of the second link, wherein the second resistance is greater than the first resistance; and coupling a flexible display to the first housing portion and the second housing portion, the flexible display covering a portion of the hinge assembly, the flexible display configured to bend when the hinge assembly bends.

10. The method of claim 9, wherein the first pin and the second pin extend from a main body of the locking element, wherein the first and second links are neighboring links in the hinge assembly.

11. The method of claim 10, wherein the pin first resistance between the first pin and the receptacle of the first link varies as the first housing portion is rotated in relation to the second housing portion.

12. The method of claim 11, wherein the second resistance between the second pin and the receptacle of the second link varies as the first housing portion is rotated in relation to the second housing portion.

13. The method of claim 12, wherein the first link is closer to the first housing portion than the second link.

14. The method of claim 9, wherein the plurality of links include magnetic poles, the magnetic poles creating a magnetic attraction that couples the plurality of links.

15. The method of claim 14, wherein the magnetic attraction between the magnetic poles increases as the first housing portion is rotated in relation to the second housing portion.

16. The method of claim 9, wherein the hinge assembly further comprises a locking element, the locking element coupling the first housing portion to a link of the hinge assembly.

17. A hinge assembly for an information handling system, the hinge assembly comprising:
- a first link coupled to a first housing portion of the information handling system;
- a second link coupled to a second housing portion of the information handling system, the second link coupled to the first link such that the first link and second link move in relation to one another to cause the hinge assembly to bend when the first housing portion is rotated in relation to the second housing portion; and
- a locking element coupling the first link and the second link, the locking element including:
  - a first pin rotatably coupled to a receptacle of the first link, the first pin and the receptacle of the first link coupled to a first coil, the first coil creating a first resistance between the first pin and the receptacle of the first link; and
  - a second pin coupled to a second coil, the second coil creating a second resistance between the second pin and the receptacle of the second link, wherein the second resistance is greater than the first resistance.

* * * * *